J. E. LEAVITT.
TRACTION DEVICE FOR WHEELS.
APPLICATION FILED APR. 30, 1917.
1,293,814.
Patented Feb. 11, 1919.
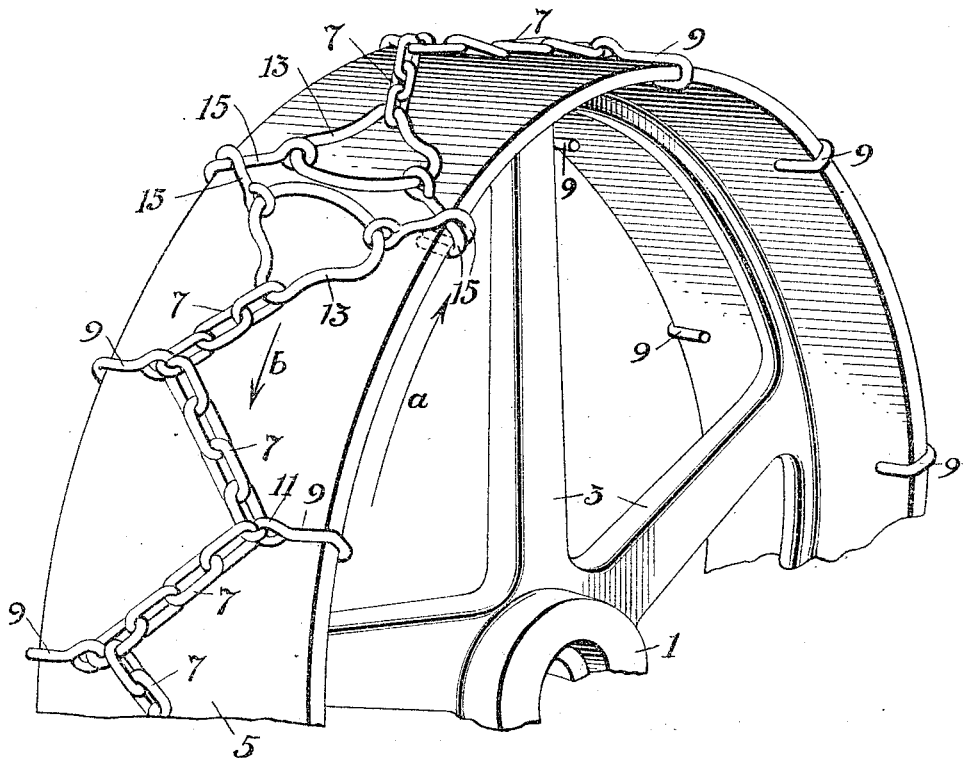
Fig. I
Fig. II
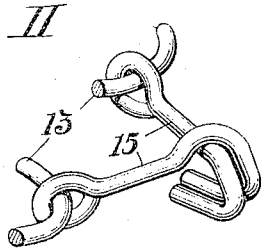
Inventor:
John E. Leavitt
by Robt. P. Hains,
Attorney

UNITED STATES PATENT OFFICE.

JOHN E. LEAVITT, OF BOSTON, MASSACHUSETTS.

TRACTION DEVICE FOR WHEELS.

1,293,814.  Specification of Letters Patent.  Patented Feb. 11, 1919.

Application filed April 30, 1917. Serial No. 165,614.

*To all whom it may concern:*

Be it known that I, JOHN E. LEAVITT, a citizen of the United States, residing at Boston, county of Suffolk, and State of Massachusetts, have invented an Improvement in Traction Devices for Wheels, of which the following description, in connection with the accompanying drawings, is a specification, like characters on the drawings representing like parts.

The invention hereinafter described relates to traction devices for wheels, and more particularly for wheels of the tractor type. It aims to provide a strong, simple device which is effective in operation, and may be quickly and easily attached to and removed from a wheel.

The character of the invention may be best understood by reference to the following description of one good form of the invention, shown in the accompanying drawing, wherein:—

Figure 1 is a perspective view of a portion of a tractor wheel equipped with a traction device embodying the invention; and Fig. 2 on an enlarged scale, is a perspective view showing terminal hooks of the device in interlocking relation.

Referring to the drawing:—

In Fig. 1 thereof is shown a portion of a tractor wheel having a hub 1, spokes 3, and a wide-tread rim 5 of usual construction.

The traction device selected as an embodiment to illustrate the invention, comprises a series of short transverse chains 7 or equivalent members. In the present instance of the invention, these transverse members are arranged to extend in a zig-zag path circumferentially of the outer surface of the wheel.

To stretch the chains transversely of the wheel to secure the same thereon, suitable means is provided for anchoring said chains to the wheel at intervals circumferentially thereof. In the present instance of the invention, this is accomplished by anchoring hooks 9 having eyes 11 connected to the transverse chains at the meeting ends thereof. These hooks are bent to embrace the edges of the rim of the wheel, so that when the device is tightened circumferentially of the rim, said hooks are drawn inward and closely grip said edges.

To connect the ends of the device, terminal links 13 may be provided, preferably of triple loop form, and pairs of anchoring hooks are connected to said terminal links and adapted to embrace and grip the edges of the rim of the wheel.

These terminal hooks may conveniently serve as simple and effective means for detachably connecting the ends of the device. To accomplish this, one pair of terminal hooks is formed to overlap and interlock with the other pair of terminal hooks, as will be noted in Fig. 2. These hooks overlap at the edges of the rim, so that when the device is tensioned, the free ends of the hooks at each edge of the rim are drawn into close engagement with one another and thereby insure the connection of the ends of the device. These terminal hooks thus serve the dual function of anchoring the device to the rim of the wheel and connecting the ends of the device.

If the wheel is rotated in the direction of the arrow $a$, the chain will tend to creep along the rim of the wheel in the direction of the arrow $b$. As a consequence, the chain is tensioned in the direction of said arrow $b$ and the uppermost terminal hooks are drawn down against and into intimate engagement with the under terminal hooks.

Preferably the device is so placed on the wheel that on forward rotation of the latter, the tension on the device will draw the uppermost terminal hooks down against the under hooks. If the tension on the device were opposite to the direction indicated by the arrow $b$, it might tend to lift the upper hooks from the lower hooks and disconnect the same.

It is desirable to use the traction devices on the wheels of the tractor when the latter is operating in the field, and to remove the devices from the wheels if they are to travel over roads, in order to prevent injury to the roads and to relieve the traction devices from wear so far as possible. Traction devices such as described are admirably adapted for these purposes, since they may be quickly and easily applied to and removed from the wheels.

To apply the device to a wheel, it is merely necessary to place it circumferentially about the wheel with its hooks 9 engaging the edges of the rim of the wheel. The device is slackened for this purpose, and permits the short chains to extend more nearly perpendicularly to the edges of the wheel than shown in Fig. 1. This allows the free ends of the hooks to be readily placed over the edges of the rim. Then the terminal links are drawn toward one another, thereby sliding the hooks along the rim and tensioning the short chains. One pair of the terminal links 15 are then placed over the other pair of terminal links so that the pairs interlock and engage the edges of the rim.

To remove the device from the wheel, it is merely necessary to slacken the device, which may be readily accomplished by slightly reversely rotating the wheel. This will permit the pairs of interlocking terminal links to be readily separated, and the device can then be readily slipped from the wheel.

The series of hooks engaging the edges of the rim of the wheel will maintain the short chains appropriately tensioned, but will permit the device to creep somewhat circumferentially of the rim.

The traction device described is strong and simple in construction, cheap to manufacture, and operates with efficient traction effect.

It will be understood the invention is not limited to the specific embodiment shown, but that various deviations may be made therefrom, without departing from the spirit and scope of the appended claims.

Claims:

1. A traction device for wheels comprising a series of zig-zag chains, anchoring hooks for said chains adapted to grip the edges of the rim of a wheel at points distributed at intervals circumferentially thereof, and terminal hooks adapted to grip said rim edges with one of said hooks overlapping the other to secure the device to the wheel circumferentially thereof.

2. A traction device for wheels comprising a series of chains or members adapted to extend transversely of the tread of the wheel, means connecting said chains or members, and means detachably to connect the terminals of the device including hooks for overlapping relation and gripping engagement with the wheel.

3. A traction device for wheels comprising a series of chains or members adapted to extend transversely to the rim of the wheel, means connecting said chains or members, and means detachably to connect the ends of the device including terminal members, and two pairs of hooks adapted to engage opposite edges of the rim of the wheel with the hooks of one pair in overlapping relation with the hooks of the other pair.

In testimony whereof, I have signed my name to this specification.

JOHN E. LEAVITT.

Copies of this patent may be obtained for five cents each, by addressing the "Commissioner of Patents, Washington, D. C."